United States Patent [19]

Mönch

[11] Patent Number: 5,277,246
[45] Date of Patent: Jan. 11, 1994

[54] SEALING ARRANGEMENT FOR A RUNNING BELT

[75] Inventor: Walter Mönch, Stuttgart, Fed. Rep. of Germany

[73] Assignee: Santrade Ltd., Lucerne, Switzerland

[21] Appl. No.: 967,020

[22] Filed: Oct. 27, 1992

[30] Foreign Application Priority Data

Oct. 29, 1991 [DE] Fed. Rep. of Germany ....... 4135613

[51] Int. Cl.$^5$ ....................... F28F 25/06; F25D 17/02; B65G 15/60
[52] U.S. Cl. ...................... 165/120; 62/266; 62/374; 198/836.1; 198/841
[58] Field of Search .................. 165/120; 62/266, 374, 62/375, 376, 380; 198/495, 836.1, 841

[56] References Cited

U.S. PATENT DOCUMENTS

| | | | |
|---|---|---|---|
| 2,124,233 | 7/1938 | Martin | 165/120 |
| 2,974,497 | 3/1961 | Carpenter et al. | 62/375 |
| 3,587,832 | 6/1971 | Robinson et al. | 198/811 |
| 3,881,594 | 5/1975 | Jepsen | 198/841 |
| 4,004,870 | 1/1977 | Guttinger et al. | 62/374 |
| 4,534,183 | 8/1985 | Hashimoto et al. | 62/374 |
| 4,819,790 | 4/1989 | Adcock | 198/836.1 |

FOREIGN PATENT DOCUMENTS

| | | |
|---|---|---|
| 0304520 | 3/1989 | European Pat. Off. |
| 1806865 | 6/1969 | Fed. Rep. of Germany. |
| 610497 | 9/1926 | France ................. 165/120 |

Primary Examiner—John Rivell
Assistant Examiner—L. R. Leo
Attorney, Agent, or Firm—Burns, Doane, Swecker & Mathis

[57] ABSTRACT

A belt travels forwardly upon the upper faces of a pair of laterally spaced, stationary sealing strips. Heat exchange liquid is sprayed against a bottom surface of the belt between the sealing strips to exchange heat with material traveling on the top surface of the belt. The upper faces of the sealing strips are provided with grooves which are inclined obliquely forwardly and inwardly so that moisture tending to migrate laterally outwardly along the belt bottom surface is returned inwardly by the grooves. Hold-down elements press downwardly against the top surface of the belt to press the belt bottom surface against the sealing strips. The hold-down elements contain obliquely inclined grooves for displacing moisture outwardly away from the center of the belt.

16 Claims, 1 Drawing Sheet

SEALING ARRANGEMENT FOR A RUNNING BELT

BACKGROUND OF THE INVENTION

The present invention relates to a sealing arrangement for a running belt, in which at least one surface, in particular its lower surface, is in contact with liquid or a condensed gaseous agent in order to accomplish the transfer of heat to or from goods resting on the other belt surface. The sealing arrangement comprises sealing strips applied against the belt in the area of its lateral edges.

Sealing arrangements of this kind have been known before in connection with belt-type coolers with an endless belt system of the type marketed by Sandvik Process Systems GmbH, Fellbach, Germany. In the case of cooling systems of this design, sealing strips are arranged along the lateral edge areas of the bottom face of a steel belt and have their narrow upper faces in contact with that bottom face of the belt. The strips are intended to prevent the cooling water, which is being sprayed from spray nozzles upon the lower face of the belt, from being splashed laterally beyond the bottom face of the belt. It is also known with these arrangements to assign to the sealing strips, brush-like sealing elements which are arranged on the outside of the sealing strip in order to prevent water adhered to the bottom surface of the belt from migrating to the lateral edges of the belt and maybe even from there to the upper belt surface.

Finally, it has also been known to provide the belt proper, in the area of its lateral edges and in the area outside of the sealing strips, with downwardly projecting elastic beads which follow the movement of the belt and which serve as dripping edges for adhered water. The production and assembly efforts required for these types of sealing arrangements is relatively substantial.

It is an object of the present invention to design a sealing arrangement of the before-described type in such a way that there is no need for a plurality of different sealing or dripping elements.

SUMMARY OF A PREFERRED EMBODIMENT

This object is achieved by a sealing arrangement in which the faces of the sealing strips which are in contact with the belt are provided with grooves extending from the area of the outer edges of the belt obliquely inwardly and forwardly with reference to the direction of movement of the belt. This design has the result that due to the relative movement between the bottom face of the belt and the oblique grooves, any liquid adhering to the belt is returned toward the center of the belt, i.e., into the area in which the spray nozzles and the collecting means for the cooling fluid are arranged. There is no need in this case for any additional sealing measures.

The grooves may be arranged parallel to one another and at a small longitudinal spacing. The grooves may be straight and extend at an angle of 30° relative to the direction of movement of the belt.

With a view to making the returning grooves as long as possible, it is advantageous to design the sealing strips as flat sections fastened on mounting sections and having their larger lateral faces extending parallel to the belt surface. In order to guarantee the best possible contact pressure between the belt and the sealing strips, each sealing strip may have assigned to it a hold-down element arranged on the opposite side of the belt. The hold-down elements can be provided with oblique grooves arranged to displace moisture outwardly.

The sealing arrangement according to the invention can be used with special advantage in connection with a belt cooling system using a steel belt, against which a liquid cooling agent, in particular water, is sprayed from below by means of spray nozzles. In order to achieve, in operation, the sealing effect on both edges of the belt, mirror-symmetrical sealing strips are provided.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
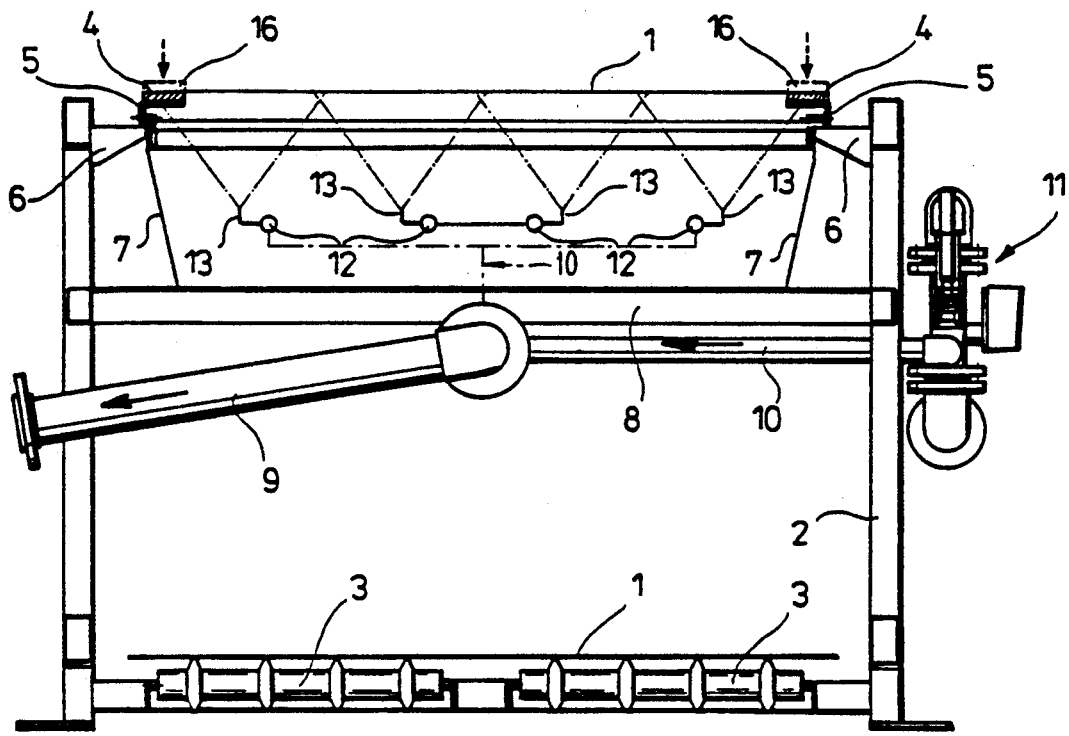
FIG. 1 is a diagrammatic cross-sectional view through a belt cooler according to the invention.
Figure 2:
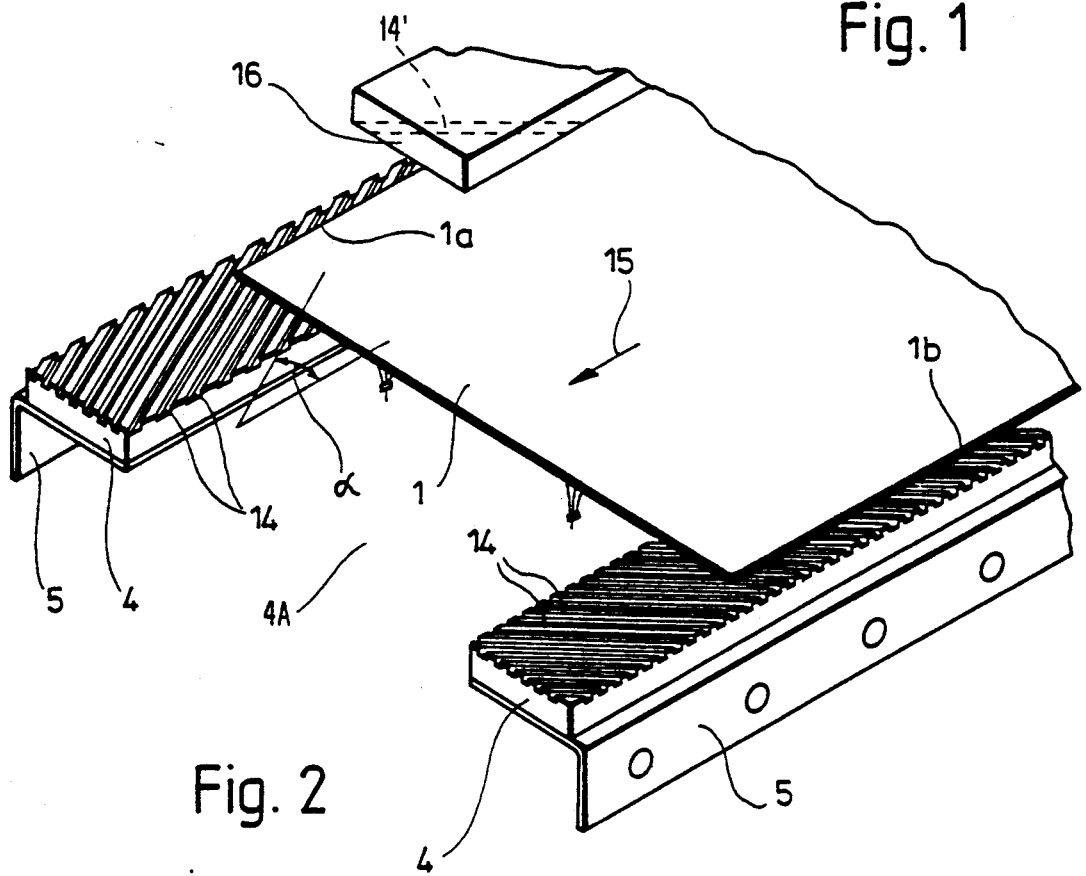
FIG. 2 is a perspective, partially cut, view of the topside of the belt cooler according to FIG. 1.

FIGS. 1 and 2 illustrate a belt cooler comprising an endless steel belt 1 which is guided around conventional support rollers in a manner not shown in detail. The belt 1 is arranged between a guide frame 2 comprising in its lower area supporting rollers 3 for the returning empty flight of the steel belt 1. Provided on the two upper ends of the guide frame are lengthwise sealing strips 4 supporting the upper flight of the steel belt 1. The sealing strips 4, which will be described in more detail by reference to FIG. 2 are mounted on metallic angle sections 5 to which they are fastened by means of an adhesive or by vulcanization. The angle sections 5 are attached, e.g., by screws, to mounting angles 6 which are rigidly fixed on the frame 2. Also connected to these mounting angles 6 are lateral splash walls 7 whose upper ends join the angular strips 5 (and thus the sealing strips 4) in tight relationship and whose lower ends terminate in a collecting trough 8 which is likewise held in the frame 2. The belt sealing strips and splash walls form a spray chamber beneath the belt.

A supply line 10 connected to a pump unit 11 serves to supply pressure to a plurality of pressure pipes 12 arranged between the splash walls 7 and within the spray chamber. Spray nozzles 13 are arranged on these pressure pipes but are indicated only schematically. Each of these spray nozzles 13 serves to spray a fluid, for example, cooling water against the bottom face of the steel belt 1, which water (now heated) then runs down between the splash walls 7 in order to be collected in the trough 8.

The thus-heated water is supplied to a recooling unit via the return line 9 and, once cooled, it is recirculated via the pump and the nozzles 13 and serves as cooling agent for goods placed on the upper surface of the steel belt 1, the goods being not shown in detail in the drawing.

The sealing strips 4 are disposed on opposite sides of a center region 4A which is superimposed relative to a center of the belt 7.

As can be seen in FIG. 2, each upper face of a sealing strip 4 resting against the underside of the steel belt 1 is provided with a plurality of straight, parallel grooves 14 extending inwardly from a location outside the adjacent outer edge 1a, 1b of the steel belt 1. The grooves 14 extend obliquely relative to the direction 15 of belt forward travel and extend generally in the same direction of travel as the belt. That is, the direction of the grooves 14 has forward and inward components. Hence, each groove extends in direction 15 and toward the center of the belt, so that the grooves of both sealing strips converge in the direction 15. In the illustrated embodiment of the invention, the groves 14 are inclined at an oblique angle $\alpha$, preferably 30°, relative to the direction of movement 15 of the belt. However, it is of course also possible to select other angles, just as it would be possible, instead of providing straight and parallel grooves 14 to give the grooves a curved shape so that they approach the direction of motion 15 from the outside toward the inside, which grooves need not extend in parallel one to the other. Still, the illustrated embodiment, where the sealing strips 4 are straight and parallel, has been found to be especially effective. The sealing strips are preferably formed of an elastic material such as plastic. Instead of using a plastic material, it is of course also possible to make the sealing strips of a different material, such as wood or metal, depending on the particular application. The selection of the material to be used is further dependent on the permissible coefficient of friction between the steel belt and the sealing strips. The properties of the cooling agent used, which may for example be caustic, also influence the type of material to be used.

It will be appreciated that as the belt travels upon the sealing strips, liquid will tend to migrate laterally outwardly along the underside of the belt 1 to a position between that underside and the sealing strips. However, in accordance with the present invention, the moving underside of the belt presses the moisture against the front edges of the grooves, causing the moisture to be displaced inwardly back toward the spray chamber due to the inclination of the grooves.

It is also possible to increase the contact pressure between the steel belt 1 and the sealing strips 4 by the use of corresponding hold-down elements 16 which may take the form of flat sections of approximately the same dimensions as the sealing strips 4. In certain special applications it would even be feasible for these holding-down elements to have their surfaces facing the belt 1 provided with transport grooves 14' which are obliquely inclined in a direction opposite the grooves 14 of the sealing strips, i.e., the grooves 14' are directed forwardly (in direction 15) and outwardly (away from the center of the belt) so that the grooves 14' of both hold-down elements 16 diverge in the direction 15. Consequently, any moisture migrating from the outside toward the inside along the top surface of the belt 1 will be urged back outwardly by the cooperative action of the moving belt top surface and the grooves 14'.

As can be seen clearly in FIG. 2, the grooves 14 on the two sealing strips 4, each of which strips is assigned to one of the belt outer edges, are provided in symmetrical mirror image relationship. Consequently, the grooves 14 on the sealing strip assigned to the lateral edge 1b extend at an angle relative to the sense of movement 15 opposite to the angle $\alpha$ at which the grooves 14 extend on the left sealing strip 14 assigned to the lateral edge 1a. The novel sealing arrangement is, of course, also effective when the lower face of the belt 1 is subjected to the action of steam, for example, for heating goods placed on its upper surface. The steam condensing on the bottom face of the belt behaves in the same way as the cooling liquid described in connection with the illustrated embodiment of the invention, as regards its return to the area between the splash walls 7.

Although the invention has been described in connection with a preferred embodiment of the invention, it will be appreciated by those skilled in the art that additions, modifications, substitutions, and deletions not specifically described may be made without departing from the spirit and scope of the invention as defined in the appended claims.

What is claimed is:

1. Conveying apparatus comprising:
a belt arranged for traveling longitudinally forwardly,
means for treating a surface of said belt in a manner producing moisture thereon which tends to migrate laterally outwardly toward laterally spaced portions of said belt surface, and
a pair of laterally spaced sealing means disposed on opposite sides of a center region superimposed relative to a center of said belt, said sealing means being arranged to engage respective ones of said laterally spaced portions of said belt surface such that said laterally spaced portions contact said sealing means and travel relative thereto,
each of sealing means defining longitudinally spaced grooves which are open toward said belt surface and inclined forwardly and inwardly toward said center region so that the outwardly migrating moisture is returned inwardly by said grooves, said grooves being open toward said center region.

2. Conveyor apparatus according to claim 1, wherein said sealing means comprise sealing strips having faces containing said grooves.

3. Conveying apparatus according to claim 2, wherein said belt surface comprises a bottom surface thereof, said faces of said sealing strips comprise top faces thereof, said grooves being closed along bottom portions thereof.

4. Conveying apparatus according to claim 3, wherein said means for treating a belt surface includes applying means for applying heat-exchange liquid against said bottom surface so that a head exchange occurs through said belt between said liquid and material conveyed on a top surface of said belt.

5. Conveying apparatus according to claim 4, wherein said applying means applies a cooling liquid to said belt bottom surface.

6. Conveying apparatus according to claim 2, wherein said surface of said belt comprises a first belt surface, and further including holding elements engaging laterally spaced portions of an opposite second surface of said belt to press said laterally spaced portions of said first belt surface against said sealing strips.

7. Conveying apparatus according to claim 6, wherein faces of said holding elements which engage said belt second surface contain inclined grooves extending forwardly and outwardly so that moisture tending to migrate inwardly along said belt second surface is returned outwardly by said grooves of said holding elements.

8. Conveying apparatus according to claim 1, wherein said grooves of each sealing means are mutually parallel.

9. Conveying apparatus according to claim 8, wherein said grooves of each sealing means are linear.

10. Conveying apparatus according to claim 9, wherein each groove forms an included angle of about 30 degrees with the direction of belt travel.

11. Conveying apparatus according to claim 1, wherein said grooves of both sealing means are mirror images of one another.

12. Conveying apparatus according to claim 1, wherein said grooves of each sealing means extend further laterally outwardly than respective lateral edges of said belt.

13. Conveying apparatus comprising:

a belt arranged for traveling longitudinally forwardly, said belt comprising first and second surfaces, means for treating said first surface of said belt in a manner producing moisture thereon which tends to migrate laterally outwardly toward laterally spaced portions of said belt first surface, a pair of laterally spaced sealing strips having faces arranged to engage respective ones of said laterally spaced portions of said belt first surface such that said laterally spaced portions contact said sealing strips and travel relative thereto.

each of said faces of said sealing strips having longitudinally spaced grooves which are open toward said belt first surface and inclined forwardly and inwardly toward a center of said belt so that the outwardly migrating moisture is returned inwardly by said grooves, and holding elements having faces engaging laterally spaced portions of said belt second surface to press aid laterally spaced portions of said belt first surface against said sealing strips, said faces of said holding elements containing inclined grooves extending forwardly and outwardly so that moisture tending to migrate inwardly along said belt second surface is returned outwardly by said grooves of said holding elements.

14. Conveying apparatus according to claim 13, wherein said belt first surface comprises a bottom surface of said belt, and said belt second surface comprises a top surface of said belt.

15. Conveying apparatus comprising:

a forwardly traveling endless belt, one flight of which having top and bottom surfaces, applying means for applying heat exchange liquid against said bottom surface so that a heat exchange occurs through said belt between said liquid and material conveyed on said top surface, whereby moisture tends to migrate laterally outwardly toward laterally spaced portions of said bottom surface, a pair of laterally spaced sealing strips disposed on opposite sides of a center region superimposed relative to a center of said belt, said sealing strips having top faces arranged to engage respective ones of said laterally-spaced portions of said belt bottom surface such that said laterally spaced portions contact said faces and travel forwardly relative thereto, said faces of said sealing strips including grooves which are open toward said belt bottom surface and sad inclined forwardly and inwardly toward said center region so that the outwardly migrating moisture is returned inwardly by said grooves, said grooves being open toward said center region and closed along bottom portions thereof.

16. A method of sealing a conveyor belt surface comprising:

moving said belt in a longitudinally forward direction while treating a surface of the belt in a manner producing moisture thereon which tends to migrate toward laterally spaced portions of said belt surface, engaging laterally spaced portions of said belt surface against respective ones of a pair of laterally spaced sealing means disposed on opposite sides of a center region superimposed relative to a center of said belt, each of said sealing means defining longitudinally spaced grooves which are open toward said belt surface and are inclined forwardly and inwardly toward said center region, and causing said belt to move forwardly relative to said sealing means such that the outwardly migrating moisture is returned inwardly to said center region through inner ends of said grooves which are open toward said center region.

* * * * *